United States Patent [19]

Straight et al.

[11] Patent Number: 5,004,620
[45] Date of Patent: Apr. 2, 1991

[54] METHOD AND APPARATUS FOR ENROBING CONFECTIONS

[75] Inventors: Jay G. Straight, Richmond; Henry P. Moore, Glen Allen, both of Va.

[73] Assignee: Eskimo Pie Corporation, Richmond, Va.

[21] Appl. No.: 515,559

[22] Filed: Apr. 27, 1990

[51] Int. Cl.⁵ .............................. A23G 3/00; B05C 5/00
[52] U.S. Cl. ...................................... 426/304; 118/16; 118/21; 118/24; 118/324; 118/DIG. 4; 426/305; 426/306
[58] Field of Search ............... 426/302, 304, 305, 306; 118/16, 21, 24, 316, 324, DIG. 4

[56] References Cited

U.S. PATENT DOCUMENTS

| | | | |
|---|---|---|---|
| 3,470,831 | 10/1969 | von Drachenfels | 426/306 |
| 4,032,667 | 6/1977 | Kreuter | 118/24 |
| 4,058,083 | 11/1977 | Miller | 118/16 |

Primary Examiner—George Yeung
Attorney, Agent, or Firm—Nies, Kurz, Bergert & Tamburro

[57] ABSTRACT

A method and apparatus for enrobing confections with an enrobing material by conveying the confections along a conveying path over which two transversely extending curtains of enrobing material are directed. Between the respective curtains a first downwardly directed air curtain is provided for smoothing a first layer of enrobing material, and downstream of the enrobing device a second air curtain is provided for smoothing a second layer of the enrobing material and to remove excess enrobing material from the confections. A bottom coating station is provided wherein the confections are guided through an enrobing material containing pan to provide substantially complete coverage of enrobing material over the surfaces of the confections.

32 Claims, 11 Drawing Sheets

METHOD AND APPARATUS FOR ENROBING CONFECTIONS

BACKGROUND OF THE INVENTION

1. Field of the Invention

The present invention relates to apparatus for coating the exterior surfaces of confections with a substantially continuous and uniform coating of a liquid enrobing material that subsequently solidifies. More particularly, the present invention relates to apparatus for enrobing frozen confections, such as ice cream bars, wherein the confections do not include sticks or other holding devices, and wherein the enrobing material can be chocolate and can include particulate matter, such as nuts, sweet crunchy material particles, or the like, for deposition on a surface portion of the confections.

2. Description of the Related Art

Several configurations of apparatus for enrobing confections, such as ice cream bars, have been disclosed. For example, in U.S. Pat. No. 4,473,027, which issued Sept. 25, 1984, to Horst F. W. Arfert, et al., an enrobing apparatus is disclosed for enrobing frozen confections such as ice cream bars having sticks extending from one end thereof. The apparatus includes a V-shaped trough that has its apex directed downwardly and extends transversely to the direction of movement of a plurality of side-by-side ice cream bars having their sticks extending transversely relative to the conveying direction. One edge of the trough includes a plurality of spaced, recessed dams with intervening baffles to separate chocolate that flows over the dams into a series of transversely spaced curtains of chocolate that are so positioned that the chocolate covers only the ice cream bars, and not the sticks.

In U.S. Pat. No. 3,228,357, which issued Jan. 11, 1966, to J. M. M. Bruschke et al., an enrobing apparatus is disclosed in which the enrobing material is sprayed over the top and bottom surfaces of an ice cream bar, which is conveyed through the apparatus by means of a pair of transversely spaced conveyors that each carry opposed spikes to extend into the outer, transversed ends of the ice cream bars for conveying them through the various sections of the apparatus. Additionally, upper air blast tubes are provided for directing air over the coated ice cream bars for removing excess chocolate and for smoothing the chocolate coating.

Additionally, in U.S. Pat. No. 3,839,987, which issued Oct. 8, 1974, to Joost M. M. Bruschke et al., a V-shaped trough provides a single, continuous, transversely extending chocolate curtain through which ice cream bars are conveyed for coating the chocolate. The bottom surfaces of the ice cream bars are coated by supporting the ice cream bars so that the bottom surfaces are carried through a pool of enrobing material provided in a container defining a bottom coater.

Although the prior art devices operate in a generally satisfactory manner, it is desired to provide an improved enrobing apparatus that is capable of operating at high speeds, that can be adjusted to accommodate confections of different sizes, and that can be used to apply enrobing liquids that include solid particles, without obstructing the outlets through which such liquids and particulate enrobing materials issue. It is therefore an object of the present invention to provide such improved apparatus.

SUMMARY OF THE INVENTION

Briefly stated, in accordance with one aspect of the present invention, an enrobing apparatus is provided for enrobing confections with a coating of enrobing material. The apparatus includes a conveyor for conveying a plurality of confections along a conveying path through the enrobing apparatus. The conveyor is of a type that permits liquid material to pass therethrough. A first enrobing station is positioned above the conveying path for providing first and second downwardly flowing sheets or curtains of liquid enrobing material, the sheets extending transversely relative to the conveying path of the articles and spaced from each other along the conveying path direction. The first and second sheets of enrobing material serve to coat the upper, side, and end surfaces of the confections.

A first downwardly directed air curtain is provided above the conveyor between the first and second downwardly flowing sheets of enrobing material and is directed against the confections on the conveyor for leveling the first coating of enrobing material on the confections. A second downwardly directed air curtain is positioned above the conveyor and is spaced downstream from the second downwardly flowing sheet of enrobing material for leveling the second layer of enrobing material.

A second enrobing station is positioned below the conveyor and is spaced downstream along the conveying path from the first enrobing station for providing a coating of enrobing material on the lower surfaces of the confections. The second enrobing station includes an open top container or pan filled with liquid enrobing material which is applied to the bottom of the confections, the pan being adjustable along the conveying path to vary the drain time of the coating from the confections. Each of the outer surfaces of the confection is therefore substantially completely and uniformly coated with the enrobing material.

The invention also provides apparatus which is easier to clean, and sanitize, and service because the various components are constructed and assembled together to minimize contact areas and crevices at which enrobing material may collect and bacteria may form.

DESCRIPTION OF THE PREFERRED EMBODIMENTS

Overall Structure and Function

Figure 1:
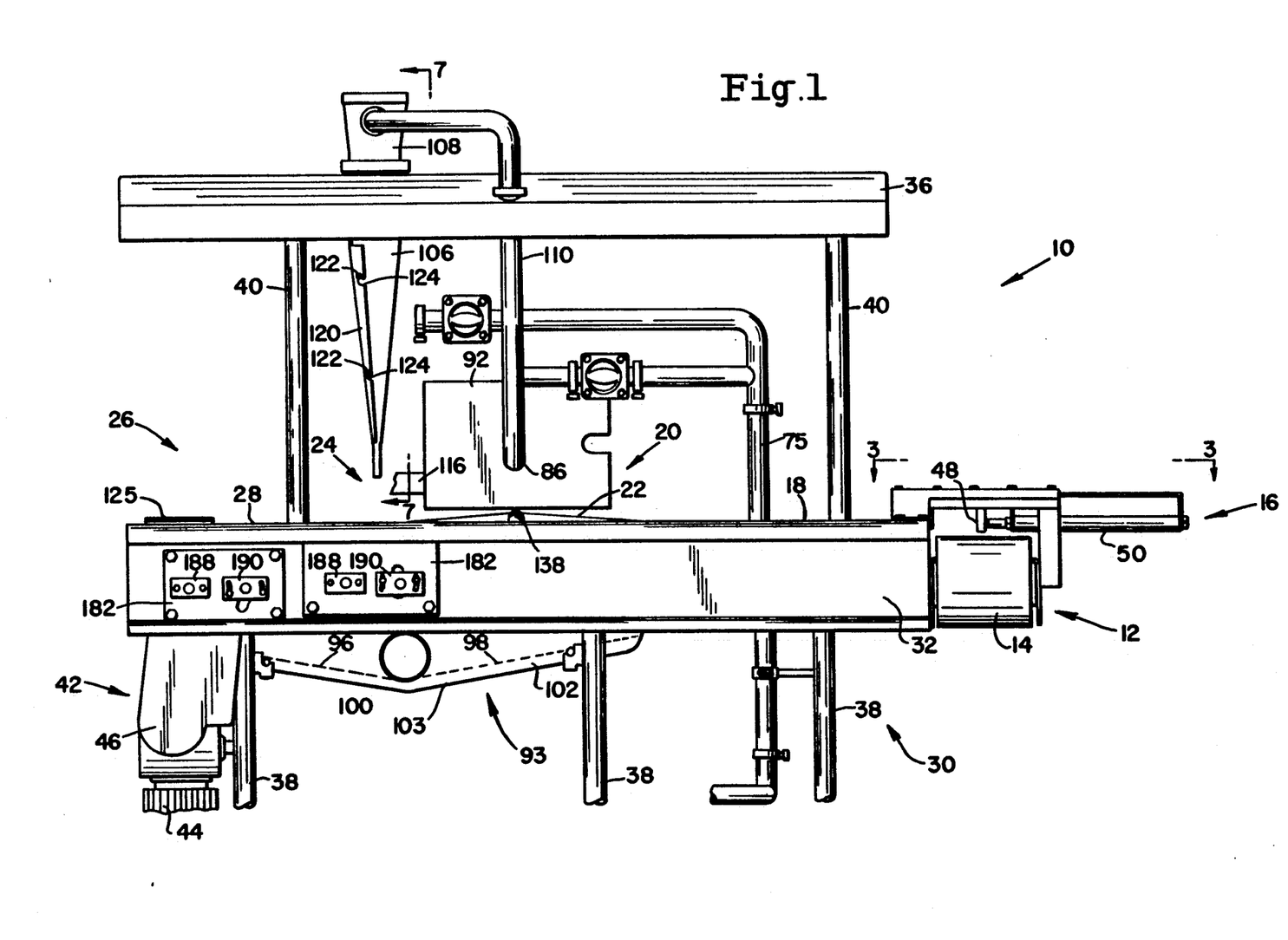
FIG. 1 is a side elevational view showing enrobing apparatus in accordance with the present invention for applying substantially complete and substantially uniform coatings of enrobing materials on the surfaces of confections that are carried through the apparatus by conveyors.

Referring now to the drawings, and particularly to FIG. 1 thereof, there is shown an enrobing machine 10 in accordance with the present invention. The machine is intended for coating frozen confection products, such as ice cream bars produced using the type of equipment disclosed in U.S. Pat. No. 2,739,545.

The apparatus includes an infeed conveyor and transfer station 12 that includes an infeed conveyor belt 14 that carries machine 10 a plurality of confections that are in substantially aligned orientation. A pusher assembly 16 is provided for pushing a predetermined number of the confections laterally, as a group, from infeed conveyor belt 14 onto a downstream spreader conveyor 18 that carries the confections in a conveying direction that is transverse relative to the direction of infeed conveyor belt 14. Spreader conveyor 18 carries the confections in the conveying direction toward a top coating application station 20, and simultaneously spaces the confections laterally from each other, relative to the conveying direction, to be received by a downstream, adjacent top coating station conveyor 22, which, in turn, carries the confections under top coating application station 20. The top, sides, and ends of the confections are coated at top coating application station 20 with a suitable enrobing material, such as chocolate. The final top coating is smoothed at a top coating smoothing station 24, which also removes excess enrobing material. The top coated confections are carried to a bottom coating station 26 by means of a bottom coating station conveyor 28, which carries the confections through a coating pan containing liquid enrobing material so that the bottom surface of the confections skims across the top surface of the enrobing material. Thus, all surfaces of the confections are covered with a layer of the enrobing material.

Each of the various portions of the apparatus is suitably mounted and supported by a frame 30 that includes a pair of spaced, substantially parallel side channels 32, 34 only one of which is visible in FIG. 1. Side channels 32, 34 support the several conveyor pulley drive shafts as well as an enrober hood 36. Side channels 32, 34 are supported by a plurality of support legs 38, and the enrober hood 36 is supported from the side channel structure by suitable hood support members 40. A machine drive system 42 is provided, including a drive motor 44 and a power transmission system 46, which is supported by a support leg 38 and machine frame 30.

Infeed Conveyor and Transfer Station

Figure 2:
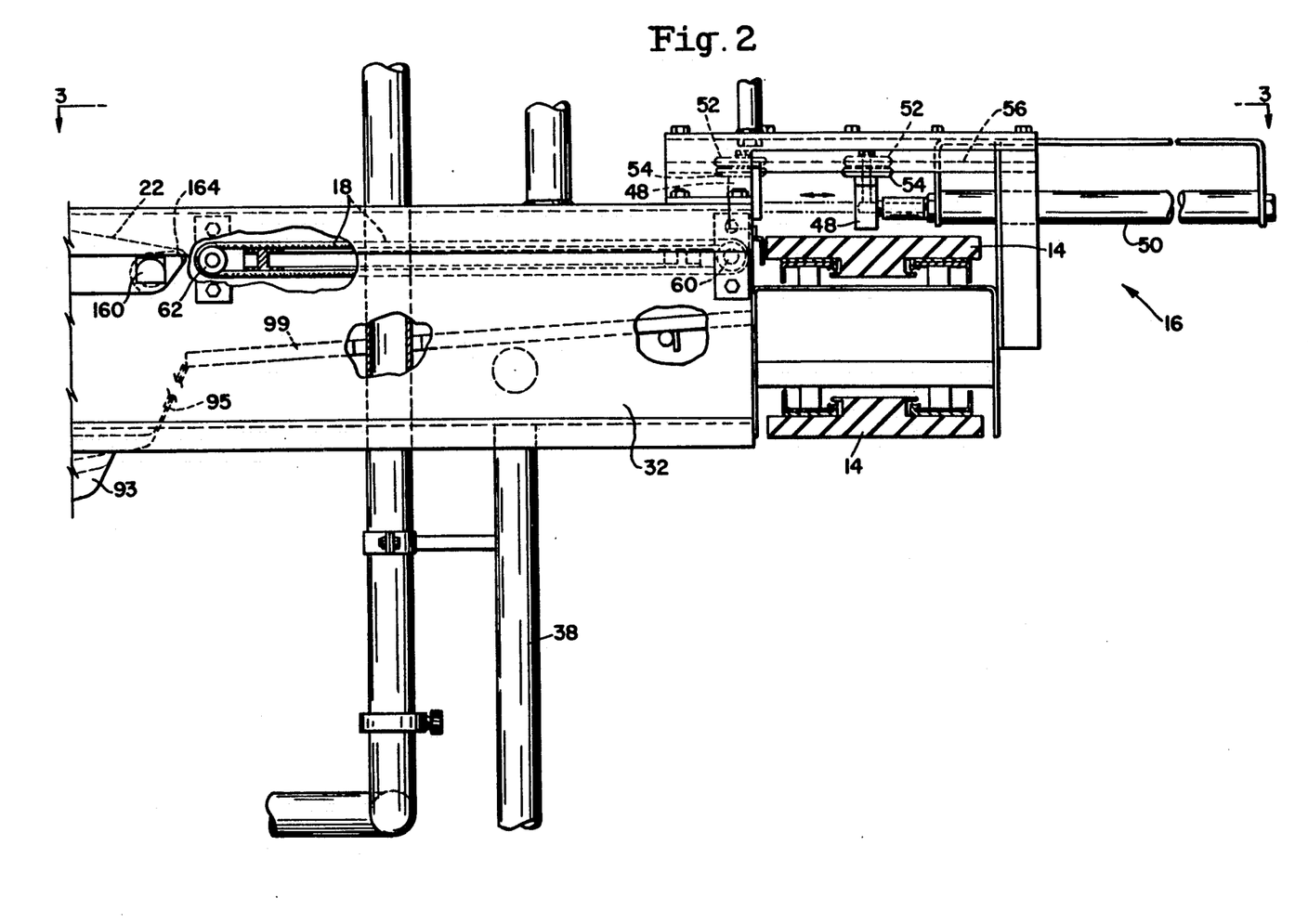
FIG. 2 is an enlarged, fragmentary side view, partially broken away and partially in section, showing the article infeed section of the enrobing apparatus shown in FIG. 1.
Figure 3:
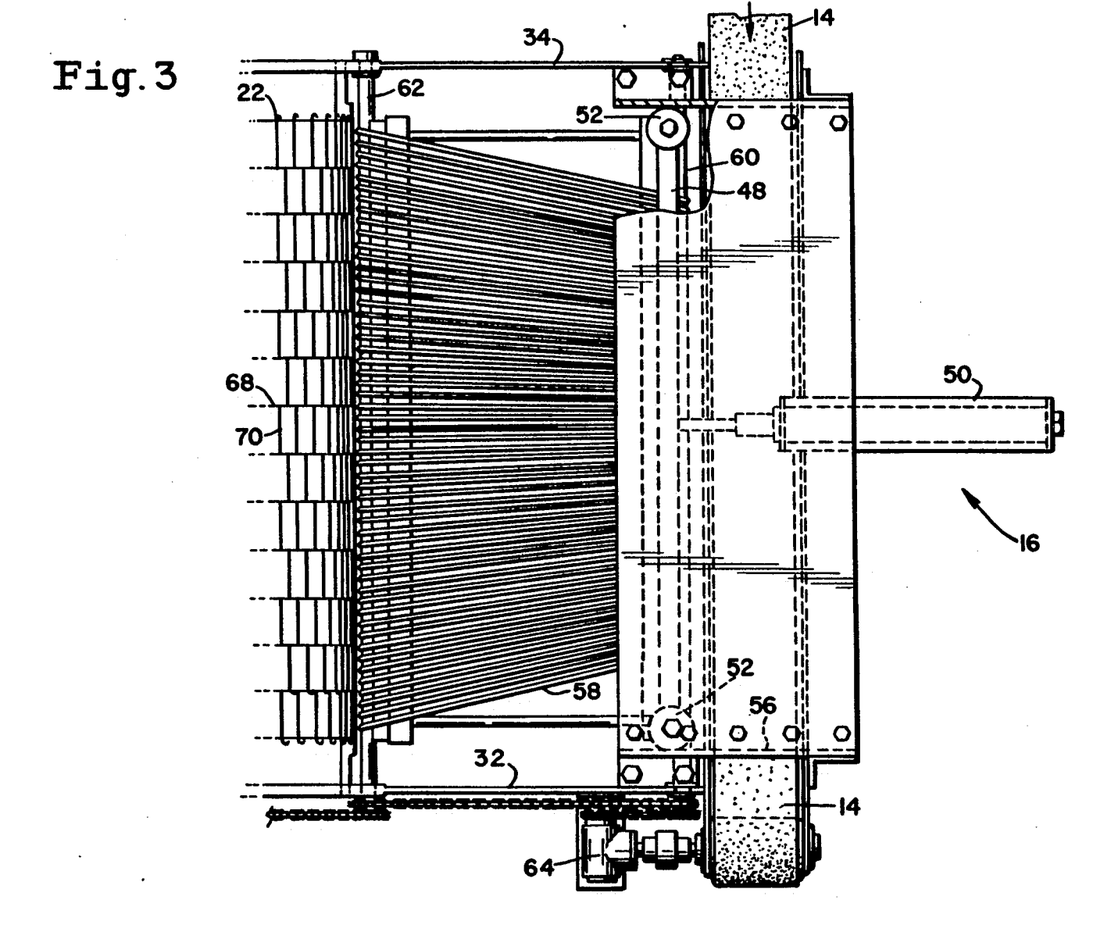
FIG. 3 is a fragmentary plan view of the infeed section of the apparatus, partially broken away and partially in section, taken along the line 3—3 of FIG. 2.

Referring now to FIGS. 1, 2, and 3, infeed conveyor and transfer station 12 includes an infeed conveyor belt 14 on which confections to be coated are supplied in serial order from a suitable confection forming machine (not shown). An example of one possible type of confection forming machine is illustrated and described in U.S. Pat. No. 2,739,545, the disclosure of which is hereby incorporated herein by reference, to the same extent as if fully set forth. Pusher assembly 16 is provided to push a predetermined number of confections from infeed conveyor belt 14 to spreader conveyor 18 by means of a pusher bar 48 that is actuated by a pusher cylinder 50 at predetermined time intervals, depending upon the speed at which confections are presented on infeed conveyor belt 14.

As best seen in FIGS. 2 and 3, pusher bar 48 includes a pair of coaxial, horizontally disposed and vertically spaced guide rollers 52 at each lateral end thereof, each pair of guide rollers 52 presents a V-shaped peripheral groove 54 that is received in one of a pair of laterally spaced horizontal track members 56 for guiding pusher bar 48 in a direction transverse to the direction of movement of infeed conveyor belt 14 and parallel with the direction of movement of the spreader conveyor 18. FIG. 2 shows in full lines the position of pusher bar 48 immediately before actuation of pusher cylinder 50, and in dashed lines the final position after the confections have been transferred from belt 14 to conveyor 18.

Additional structure and operational details of one form of suitable infeed conveyor system are disclosed in U.S. Pat. No. 3,839,987, the disclosure of which is incorporated herein by reference to the same extent as if fully set forth.

Spreader Conveyor

Referring once again to FIGS. 2 and 3, spreader conveyor 18 is positioned on one side of infeed conveyor belt 14 to receive confections that are presented to spreader conveyor 18 by pusher bar 48. As best seen in FIG. 3, spreader conveyor 18 includes a plurality of endless flexible bands 58 that extend generally in the conveying direction, and that progressively diverge laterally outwardly relative to the conveying direction from the center of spreader conveyor 18 to the outer ends thereof. Flexible bands 58 each extend between an upstream roller 60 and a downstream roller 62, each of which preferably includes a plurality of axially spaced peripheral grooves to receive bands 58 and to retain the relative positions between adjacent bands 18. Preferably, the speed of operation of spreader conveyor 18 is interrelated with the speed of operation of infeed conveyor belt 14 through a drive arrangement that includes a right angle drive 64.

After the confections have been transported downstream in the conveying direction a sufficient distance and have been laterally spaced from each other a distance depending upon the degree of divergence of the respective flexible bands 58, the laterally aligned and spaced confections are presented to and are received by top coating section conveyor 22 which, as shown in FIG. 3, can be defined by a plurality of laterally spaced, axially extending wires 68, that are interconnected with a plurality of transverse wires 70. Top coating section conveyors 22 is preferably an openwork construction to permit unimpeded passage therethrough of excess liquid enrobing material. Further structural details of one suitable form of spreader conveyor are also set forth in U.S. Pat. No. 3,839,987, which has been incorporated by reference herein.

Top Coating Station

Figure 4:
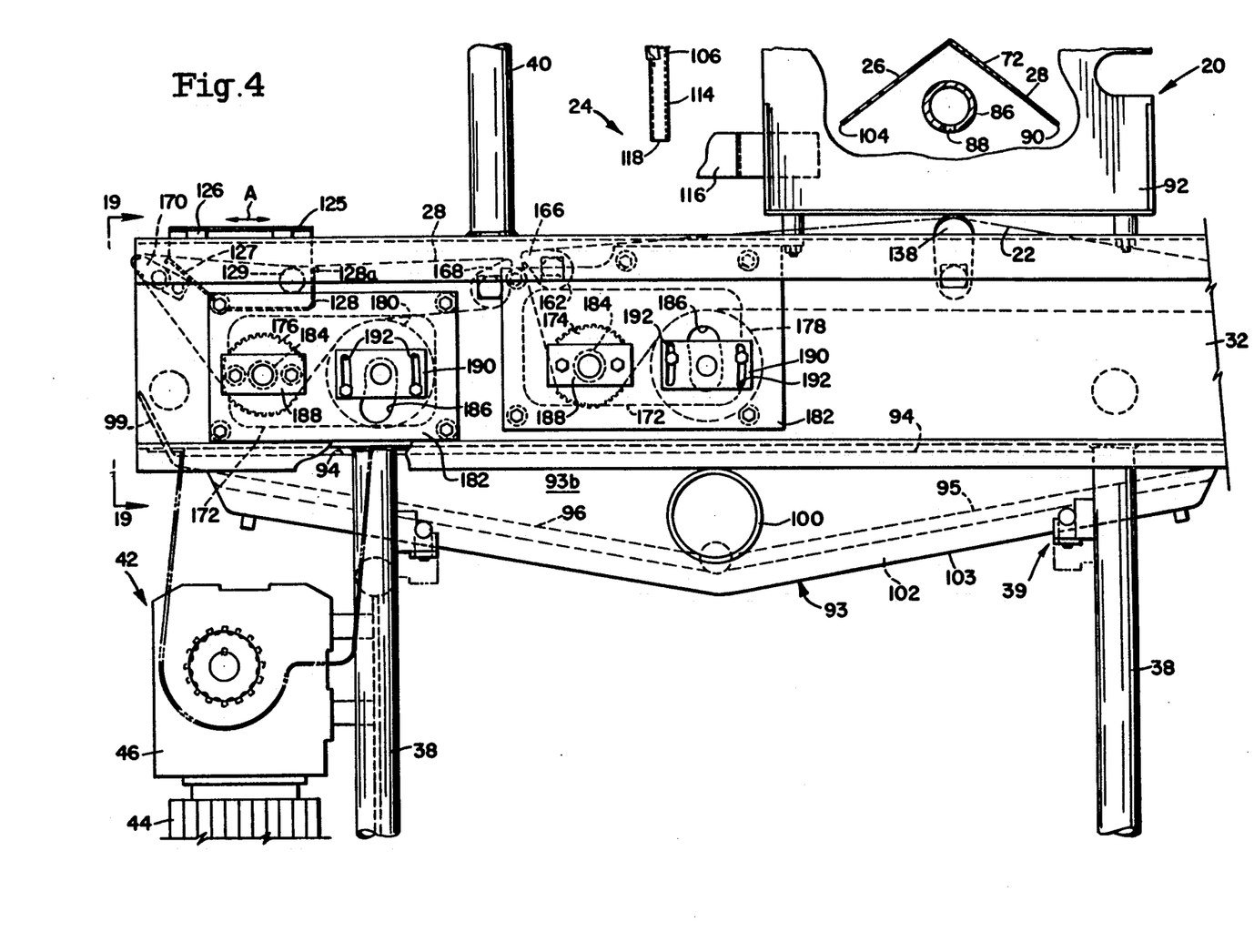
FIG. 4 is an enlarged, fragmentary view showing enrobing material coating stations for separately coating the upwardly facing and downwardly facing surfaces of confections, and the top coating smoothing station, all forming part of the apparatus shown in FIG. 1.

Referring now to FIG. 4, the top coating station conveyor 22 carries the confections through top coating station 20. An inverted, V-shaped diverter 72 is positioned with its apex directed upwardly and extends transversely across and above top coating station conveyor belt 22. Positioned above diverter 72, and extending longitudinally therealong, is an enrobing material distributor 74 (see FIG. 8) that receives enrobing material supplied through conduit 75 from an enrobing material reservoir (not shown). Distributor 74 is positioned to deposit the enrobing material at the apex of the inverted V of diverter 72. The enrobing material flows downwardly along each of the diverging legs 76, 78 of diverter 72 to form a pair of continuous, thin curtains of enrobing material that extend transversely across top coating station conveyor belt 22 and that are spaced from each other along the conveying direction by a predetermined distance.

Figures 5, 6, 9:
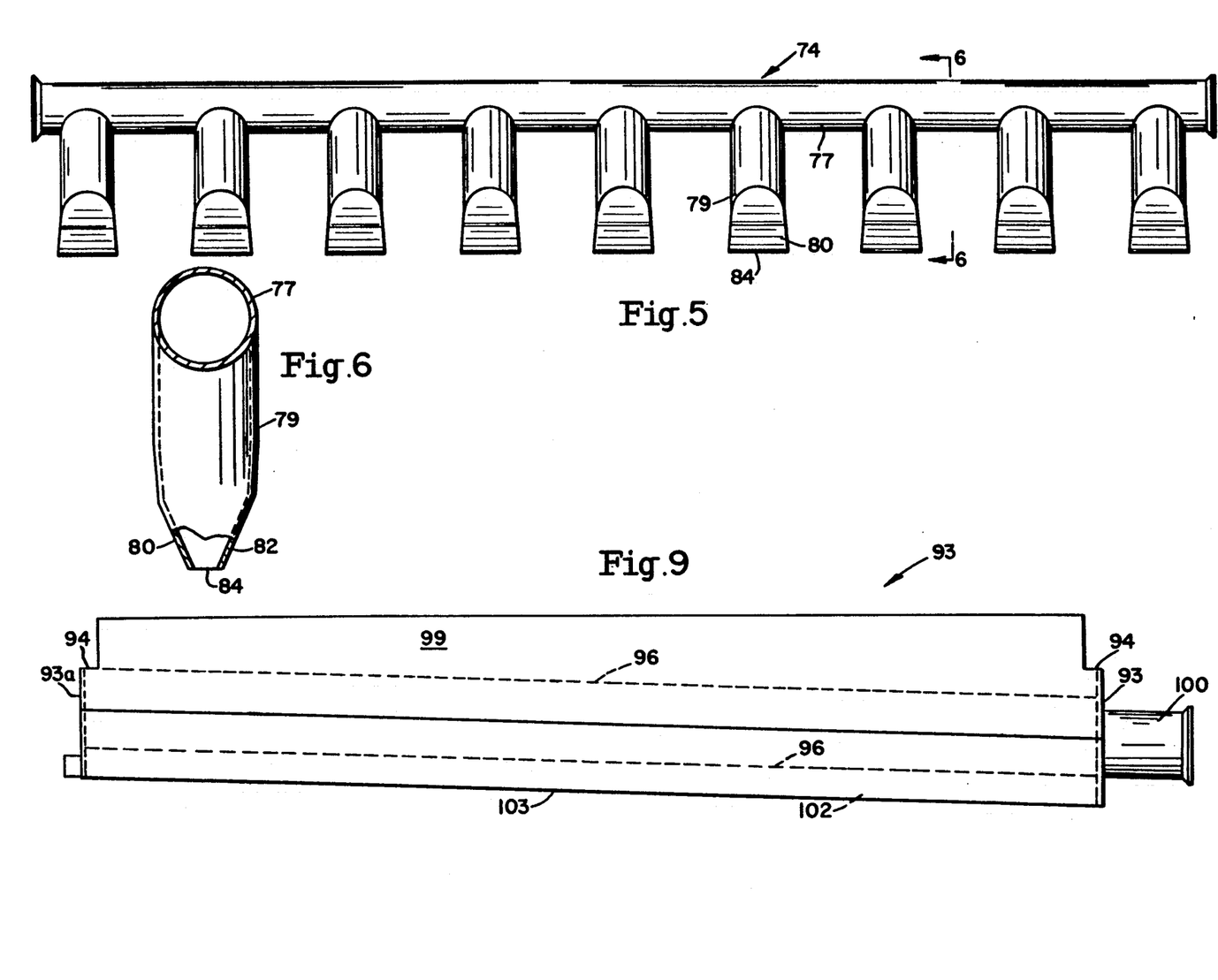
FIG. 5 is a side elevational view taken generally along line 5—5 of FIG. 8 of the enrobing material feed distributor for providing enrobing material to the top surface enrobing material coating station.
FIG. 6 is a side cross-sectional view of the enrobing material feed distributor, partially broken away, taken along the line 6—6 of FIG. 5.
FIG. 9 is a left end view of a drip collection pan provided below the top and bottom coating stations of the apparatus shown in FIG. 1.

A preferred structure for enrobing material distributor 74 is illustrated in FIGS. 5 and 6, which show a transversely extending tubular manifold 77 from which depend in a downward direction a plurality of individual distributor tubes 79 that terminate in converging walls 80, 82 that define rectangular openings 84. The longitudinal axes of the respective rectangular openings 84 are aligned and extend in a direction parallel with and are spaced vertically above the apex of diverter 72.

Extending transversely relative to the conveying direction, and substantially parallel with and below the apex of diverter 72, is an air manifold 86 having a longitudinally extending, downwardly directed narrow air outlet slot 88. Air manifold 86 provides a downward curtain of pressurized air that impinges upon the respective confections to smooth the first coating layer that is provided by enrobing material that drops from the leading edge 90 of diverter 72. Additionally, air manifold 86 provides under diverter 72 a volume of air that is slightly above atmospheric pressure to keep the respective enrobing material curtains from curving inwardly toward each other so that each of the enrobing material curtains fall substantially vertically. Air manifold 86, as well as diverter 72 and enrobing material distributor 74, are each supported in a pair of spaced side plates 92 that are, in turn, supported from respective side channels 32, 34.

Enrobing material that passes between respective confections, along with the excess enrobing material that is blown from the confections by the air curtain in the smoothing operation, passes through top coating station conveyor belt 22 and is received in an open top drip pan 93 that is removably mounted on legs 38 via pin and bracket assemblies 39 between channels 32 and 34 and extends along the conveying path of the confections from approximately the entrance to top coating station 20 to approximately the exit from bottom coating station 26, as shown in FIGS. 2 and 4. Drip pan 93 has side walls 93a and 93b each terminating in an upper edge 94. Pan 93 also has inclined bottom walls 95, 96 that slope oppositely downwardly in the longitudinal direction and also slope downwardly in a transverse direction from far side wall 93a to near side wall 93b (see FIG. 9) toward a central outlet opening 100 to provide a laterally extending outlet for the enrobing material, which can then be conveyed away from the apparatus. As shown best in FIG. 2 the leading edge of pan 93 has an upwardly inclined lateral wall 97 joining with a downwardly inclined ledge of a pan or trough 98 positioned underneath conveyor 18. The trailing edge of pan 93 has an upwardly inclined lateral wall 99 positioned under the exit end of station 26. Drip pan 93 also includes a serpentine type heating channel 102 provided below each of bottom walls 95 and 96 within a hollow space defined by a pair of spaced bottom walls 103. Hot water is circulated through heating channel 102 so that collected enrobing material that falls through the conveyor is maintained at a sufficiently high temperature so that it is fluid and can be readily pumped.

Because drip pan 93 is readily removable it facilitates cleaning of the entire apparatus. In addition, because the bottom of the pan is sloped in both the longitudinal and transverse directions, it is possible to provide a side outlet 100 rather than a bottom outlet, thereby affording more working room underneath the pan for cleaning or repair purposes.

Top Coating Smoothing Station

Figure 7:
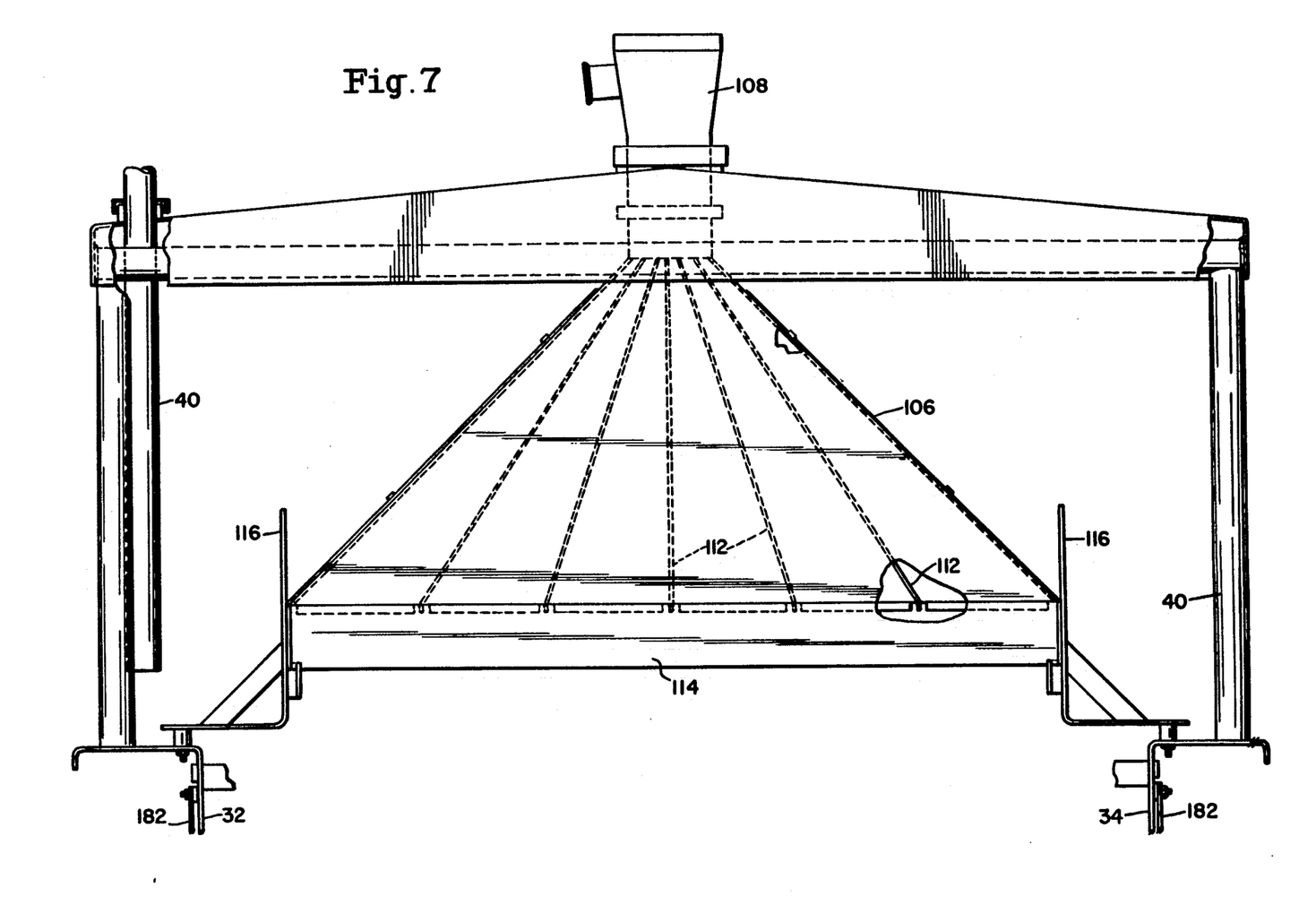
FIG. 7 is an elevational view taken generally along line 7—7 of FIG. 1 in the article conveying direction of the apparatus, showing the air manifold and distributor for smoothing the top coating of enrobing material after it has been applied to the upwardly facing surfaces of the confections.
Figure 8:
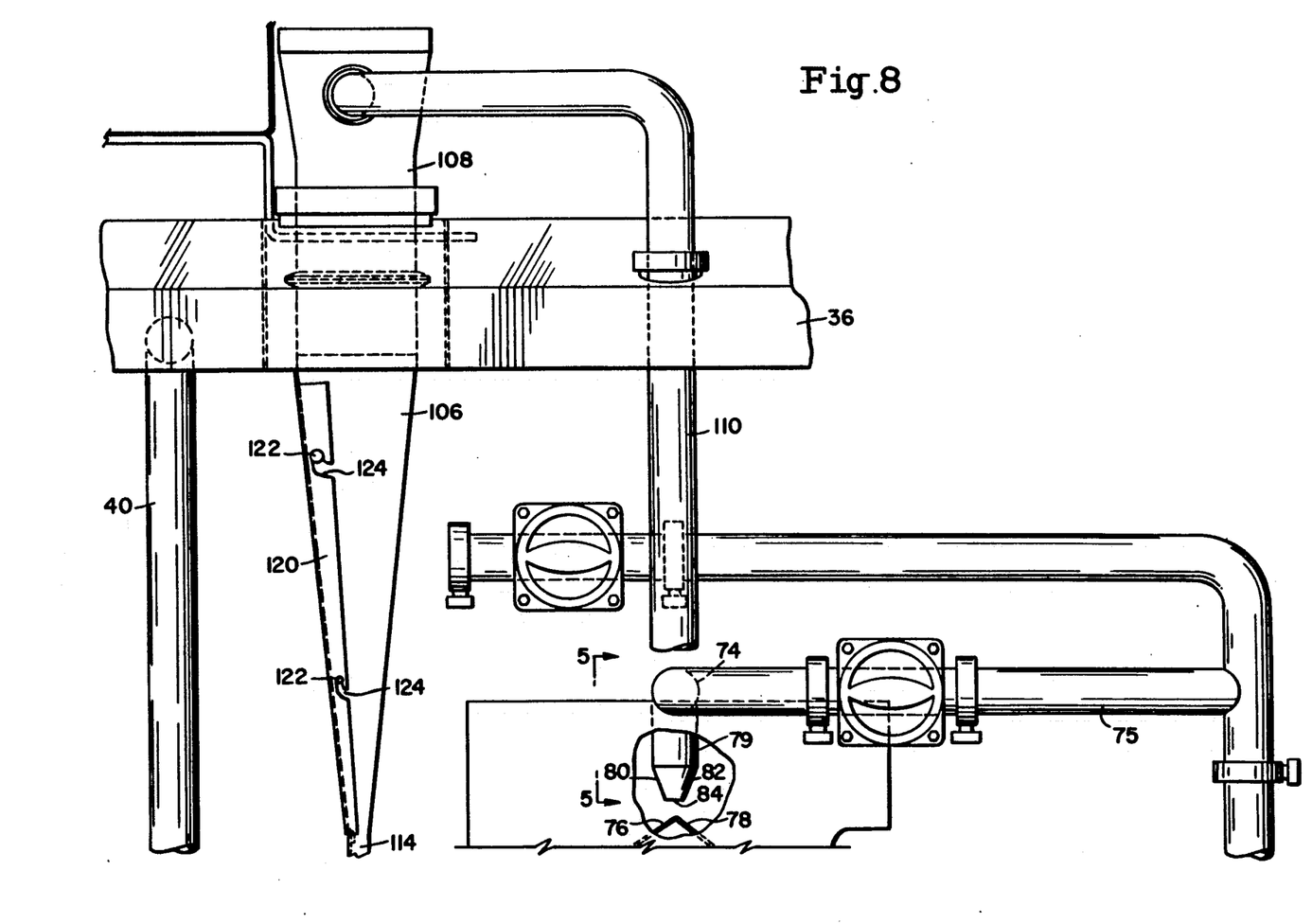
FIG. 8 is an enlarged, fragmentary side view of the apparatus of FIG. 1, showing the top surface smoothing air manifold, a portion of the enrobing material diverter, and a portion of the conduits for providing pressurized air to the manifold and for providing enrobing material to the enrobing material feed distributor.

In addition to an upstream enrobing material curtain that flows over leading edge 90 of diverter 72, a downstream curtain is simultaneously provided in the form of enrobing material that passes downwardly along downstream leg 76 and over trailing edge 104. Enrobing material applied to the confections as a result of passage of the confections through the downstream curtain is leveled at top coating smoothing station 24 by means of an air manifold 106 that is positioned downstream from the second curtain, as shown in FIG. 4. The structure of air manifold 106 is best seen in FIGS. 7 and 8, which show an air supply plenum 108 that communicates through an air supply conduit 110 with a source (not shown) of pressurized air. Pressurized air enters air supply plenum 108 and passes into air manifold 106, which diverges outwardly in a transverse direction, as best seen in FIG. 7, and that converges inwardly in a downward direction, as best seen in FIG. 8. Air manifold 106 includes a plurality of distribution vanes 112 to provide a substantially uniform volume of air flow to a nozzle member 114 that is positioned below air manifold 106, and that is supported in a pair of laterally spaced support brackets 116 that are attached to a respective one of side channels 32, 34. Nozzle member 114 includes a rectangular, slotted, downwardly facing opening 118 (see FIG. 4) to provide a transversely extending curtain of smoothing air.

As shown in FIG. 8, to facilitate cleaning air manifold 106 includes a removable cover 120 that extends in a transverse direction relative to the conveying direction, and that is supported from a plurality of support pins 122 that extend outwardly from air manifold 106. Removable cover 120 includes positioning and retaining slots 124 provided in each laterally outward wall thereof to receive pins 122.

Bottom Coating Station

Referring once again to FIG. 4, after the partially coated confections pass through top coating smoothing station 24, they are transferred from top coating station conveyor belt 22 to a bottom coating station conveyor belt 28, which carries the confections over a bottom coating station pan 125. The structure of belt 28 is preferably also an openwork structure, similar to that of top coating station conveyor (see FIG. 3) to permit enrobing material to readily pass therethrough.

Figure 19:
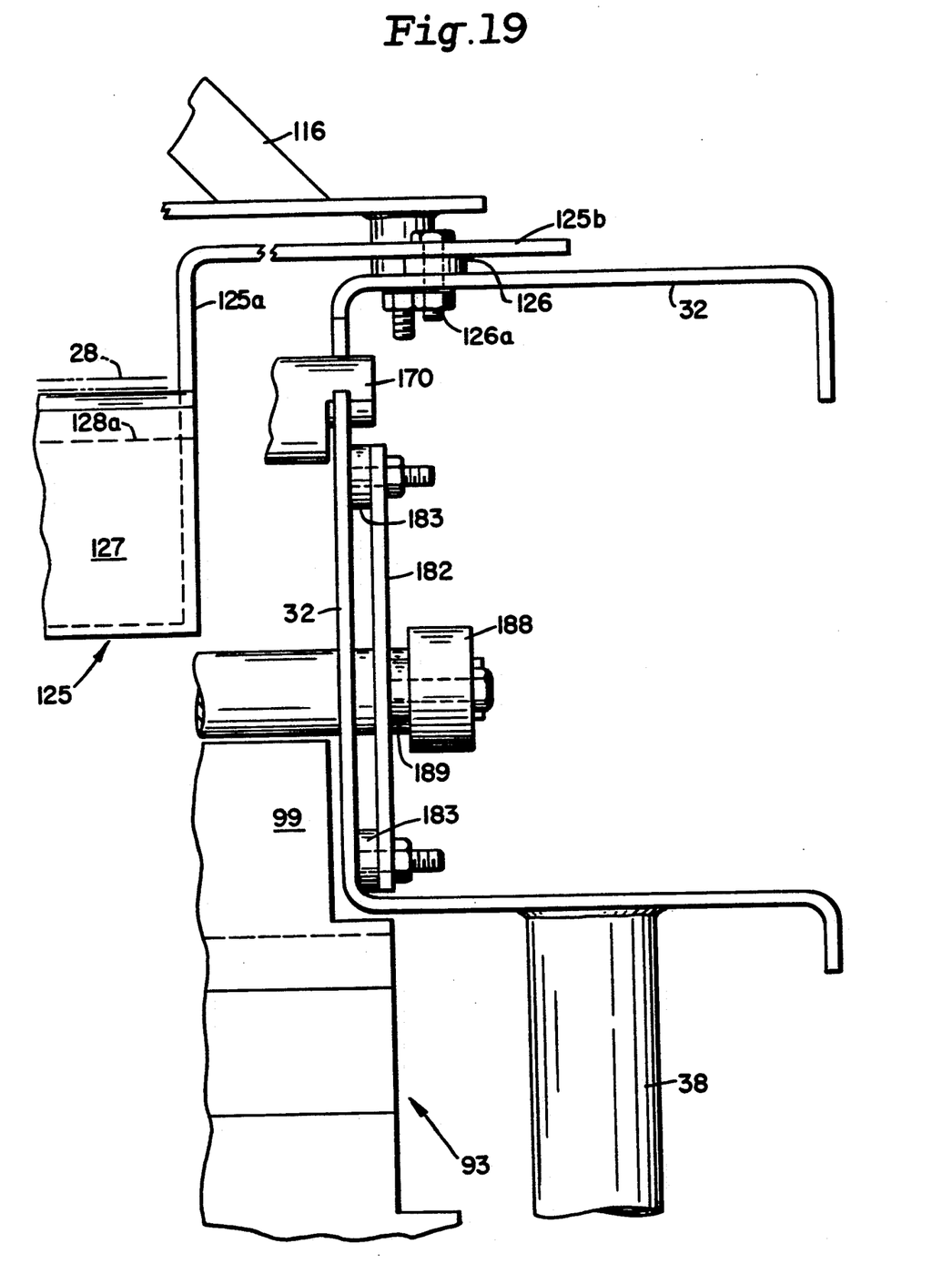
FIG. 19 is a fragmentary end view, taken in the conveying direction, of a side channel showing a side cover plate and drive sprocket shaft support taken along the line 19—19 of FIG. 4.

As shown best in FIGS. 4 and 19, pan 125 has vertical sidewalls 125a depending from horizontal flanges 125b which rest on the horizontal surfaces of channels 32 and 34 via spacers 126. Bolt assemblies 126a extend through flanges 125b, spacers 126, and longitudinal slots in channels 32 and 34 which permit pan 125 to be longitudinally adjustably positioned along conveyor 28 to vary the drain time of the coating after it has been applied to the bottom of the confection.

Pan 125 has a rear inclined wall 127 and a front vertical wall 128 the upper edge 128a of which serves as an overflow gate to establish the level of coating material in pan 125.

A bottom coating distribution tube 129 extends transversely through the pan below bottom coating station conveyor belt 28 and includes an upwardly directed slot 130 (see FIG. 10) through which enrobing material is caused to flow into pan 125.

Figure 10:
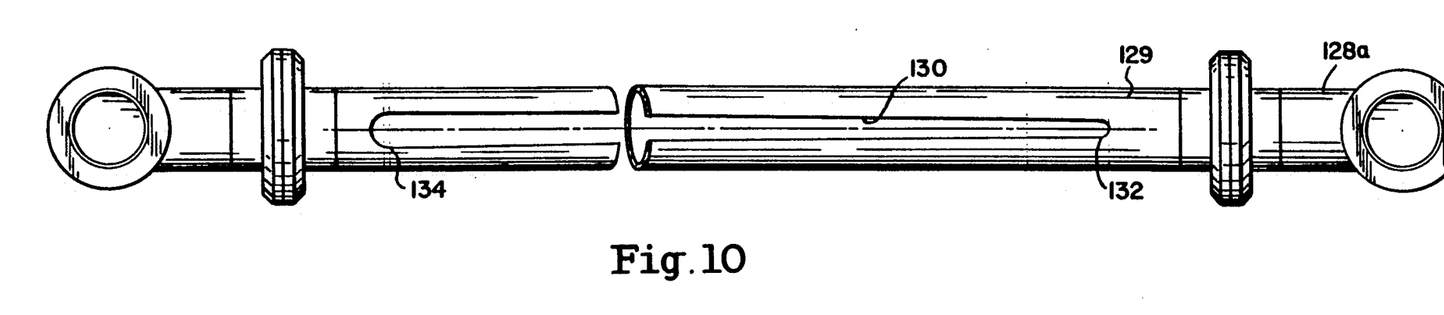
FIG. 10 is a top view, partially broken away, showing the bottom coating distribution tube with a distribution slot that tapers in the axial direction of the tube.
Figure 10A:
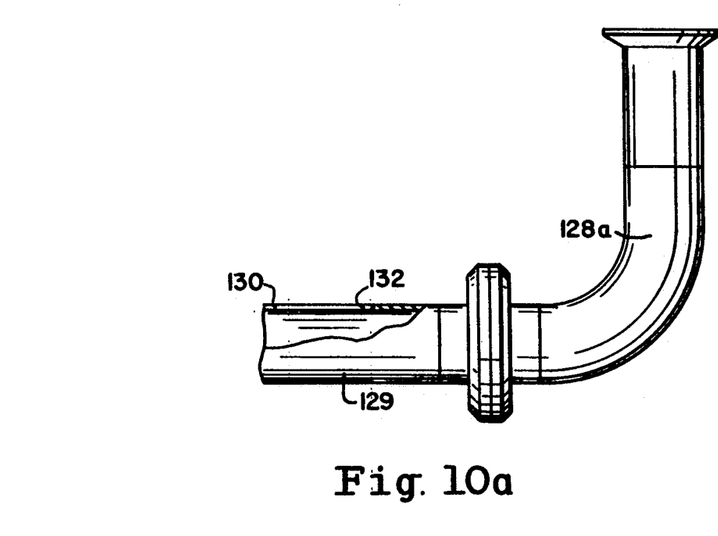
FIG. 10a is a fragmentary side view showing the connection of an elbow connecting an enrobing material supply conduit with the bottom coating distribution tube.

As shown in FIG. 10, the configuration of slot 130 provided in bottom station distribution tube 128 extends in an axial direction along tube 128 and diverges from a relatively narrow slot at one end 132, to a relatively wider slot at the opposite end 134. The divergence of slot 130 prevents entrained particles, such as chopped peanuts, crunch particles, or the like, that are dispersed in the enrobing material from blocking flow through the slot. Because the enrobing material enters tube 128 through elbow 128a (see FIG. 10a), which is in communication with an enrobing material reservoir (not shown), enrobing material flows along tube 128 from right to left as viewed in FIG. 10, and entrained particles that might be larger than the slot width at a particular point are carried along the slot to a point where the width of the slot is large enough so that the particles can pass through the slot to thereby prevent plugging-up of the slot with particulate material.

Center Height Adjustment of Top Coating Conveyor

Referring once again to FIG. 4, top coating station conveyor belt 22 is shown from the side as sloping in an upward direction toward the vertical centerline of enrobing material diverter 72 and as sloping in a downward direction beyond that point. The respective upward and downward inclinations of belt 22 permit the substantially vertically falling curtains of enrobing material at top coating station 20 to impinge against and coat the front face of the confection on the upwardly sloping portion, and to impinge against and coat the rear face of the confection on the downwardly sloping portion, to thereby assure that those surfaces are directly contacted with the enrobing material.

Figures 11, 12, 13, 14:
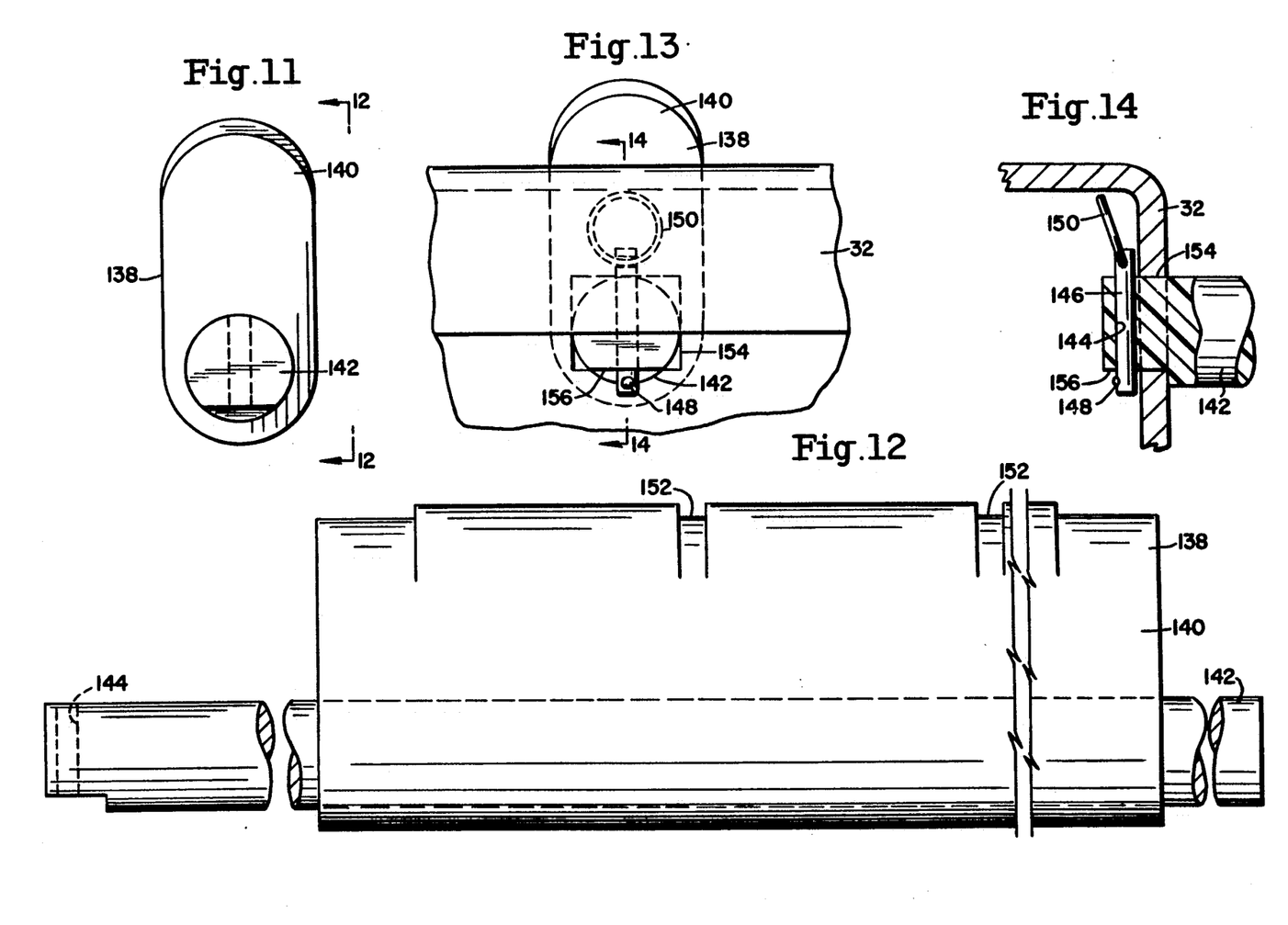
FIG. 11 is an end view of a wire belt lifter that is positioned below the upper rim of the conveyor at the top coating application station.
FIG. 12 is a fragmentary side view of the lifter of FIG. 11, taken along the line 12—12 thereof.
FIG. 13 is a fragmentary side view showing the lifter of FIG. 11 retained in position in the machine side channel.
FIG. 14 is a fragmentary cross-sectional view of the lifter shaft and machine side channel, taken along the line 14—14 of FIG. 13.

The slope of the top coating station conveyor belt 22 is provided by a belt lifter 138, the structure of which is shown in greater detail in FIGS. 11 through 14. In general, lifter 138 includes an eccentrically positioned lobe 140 that is carried on a support shaft 142 that extends between and is carried in respective side channels 32, 34. Lateral retention in the machine support shaft 142 is provided by means of transverse holes 144 (see FIG. 14) positioned at each end of the shaft, the holes adapted to receive a retaining pin 146 having a ball detent 148 at one end and a withdrawal ring 150 at the opposite end. Lifter 138 is preferably made of a material that results in low frictional drag on conveyor belt 22 and it preferably can be made from plastic materials, such as Delrin or the like. Additionally, as shown in FIG. 12, the radially outermost surface of the lobe 140 preferably includes a plurality of recessed slots 152 to slidably receive axially extending wires 68 of top coating station conveyor belt 22 to aid in guiding the belt in the conveying direction.

As best seen in FIGS. 13 and 14, lifter 138 is non-rotatably supported in a pair of opposed, substantially square openings 154 provided in side channels 32 and 34. Each outer end of support shaft 142 includes an axially extending flat undercut 156 that is adapted to rest on a surface of square opening 154, with the circular portion of the shaft ends contacting the other surfaces of the square opening to non-rotably support and retain lobe 138.

Conveyor Belt Overall Height Adjustment

Figures 15, 17, 18:
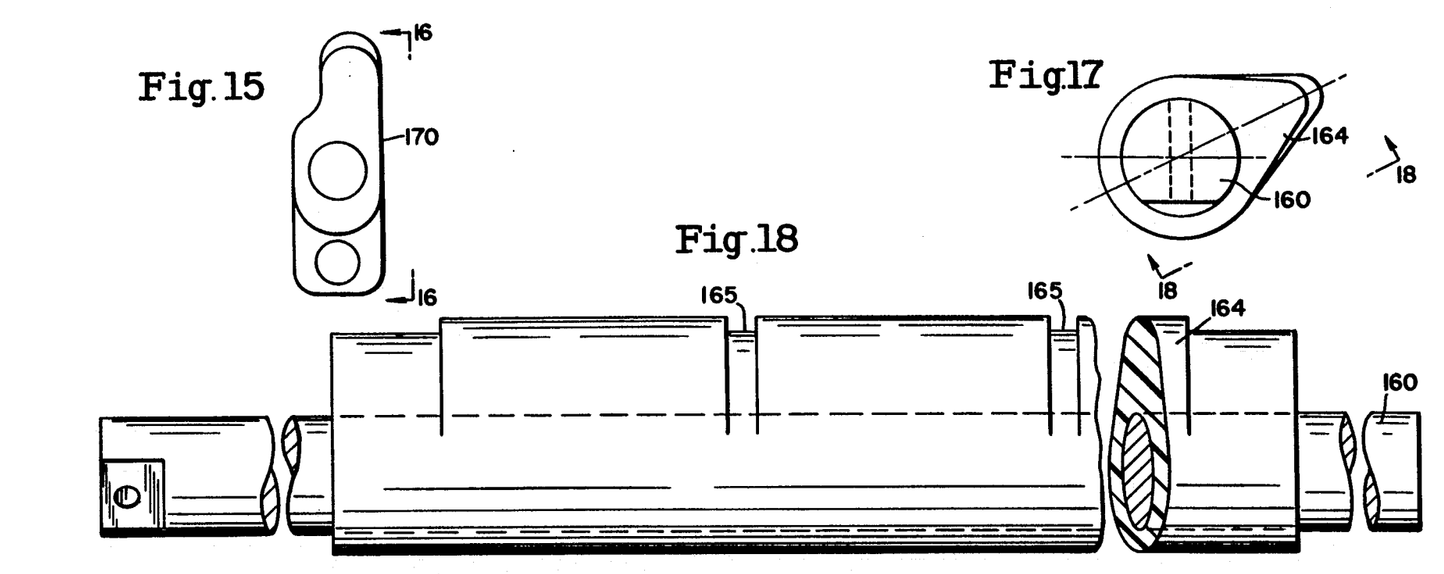
FIG. 15 is an end view of a nose bar over which the conveyor passes adjacent the exit from the bottom coating station.
FIG. 17 is an end view of another form of nose bar, over which the conveyor passes adjacent the juncture of the top and bottom coating stations.
FIG. 18 is a fragmentary side view, partially in section, of the nose bar of FIG. 17, taken along the line 18—18 thereof.

In addition to the center height adjustment provided for top coating station conveyor belt 22, each of top coating station conveyor belt 22 and bottom coating station conveyor belt 28 is vertically adjustable relative to side channels 32, 34. As best seen in FIGS. 4 and 2, at both the upstream support shaft 160 and the downstream support shaft 162 top coating section conveyor belt 22 passes around eccentrically positioned lobes or nose bars 164, 166, respectively, that provide offset positioning surfaces for supporting belt 22 in a manner similar to that of lifting lobe 138 hereinabove described. The structure of each of respective nose bars 164, 166 is illustrated in FIGS. 17 and 18. By suitably rotating the carrier shafts 160, 162 upon which the respective nose bars are carried, the heights of the respective positioning surfaces at the ends of the top coating station conveyor belt can be shifted upwardly or downwardly a suitable amount, relative to side channels 32 and 34, depending upon the thickness of the confections.

Figure 16:
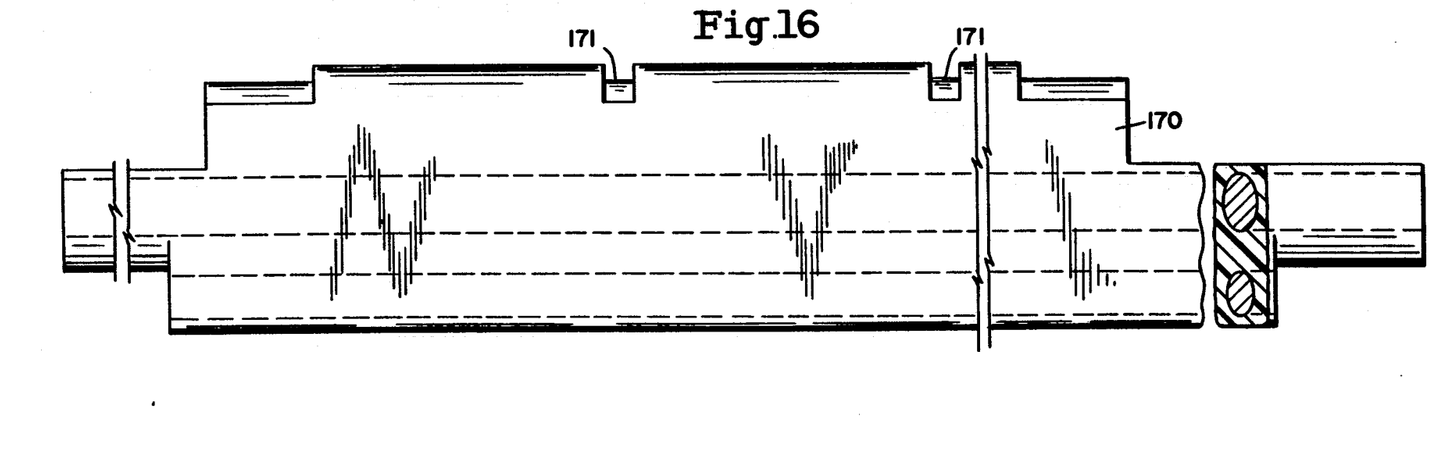
FIG. 16 is a fragmentary side view, partially in section, of the nose bar of FIG. 15, taken along the line 16—16 thereof.

Similarly, as shown in FIG. 4, bottom coating station conveyor 28 also includes respective eccentrically carried nose bars 168, 170 at each of the upstream and downstream ends thereof, upstream nose bar 168 corresponding in structure with those of top coating station conveyor belt 22 as illustrated in FIGS. 17 and 18, and downstream nose bar 170 having a structure as illustrated in FIGS. 15 and 16. As is apparent, rotation of the respective upstream and downstream nose bars 168, 170 permits positioning of the bottom coating station conveyor upwardly or downwardly relative either to the top coating station conveyor belt, or with respect to the bottom coating station pan and distribution tube. Additionally, each of nose bars 164, 166, and 170 includes a plurality of recessed slots 165, 167, and 171, respectively, to slidably receive axially extending wires of the respective conveyor belts, in a manner similar to slots 152 of lifting lobe 140.

Because the nose bars are adjustable the confections are transferred smoothly from one conveyor to another, e.g., at the transfer point between nose bars 166 and 168, without damaging or breaking the confections.

Side Channel Structure

As shown in FIG. 4, respective side channels 32, 34 include a plurality of opposed, large substantially rectangular openings 172 to permit the respective top coating station conveyor belt drive sprocket 174 and bottom coating station conveyor belt drive sprocket 176 to be removed laterally from the apparatus through one or the other of side channels 32 or 34. Openings 172 are sufficiently large to permit drive sprockets 174, 176 to pass therethrough, as well as to permit respective idler sprockets 178, 180 to pass therethrough. Sprocket shaft support plates 182 are bolted against spacers 183 to cover the respective openings 172, and to rotatably receive the ends of the respective drive and idler sprocket shafts. In that regard, the positioning apertures 184 for the respective drive sprocket shafts are circular and provide a fixed position for the respective drive sprocket shafts, whereas the openings 186 for the idler sprocket shafts are angular, to permit shifting of the position of the axis of the respective idler sprocket shafts to accommodate length variations of the claims that carry the respective conveyors.

A shaft support plate 188 is removably bolted to but spaced from side plates 182 via spacers 189 to rotatably receive the ends of the respective drive sprocket shafts. Similarly, a shaft support plate 190 is also removably bolted to side plates 182 to receive the ends of the respective idler sprocket shafts. Support plates 190 also include elongated arcuate slots 192 to permit adjustment of the positions of the respective idler sprocket shafts, to permit adjustment to take up slack in the conveyor belt drive chains (not shown), which can arise if changes are made in the elevation of the respective belts by adjustment of the respective nose bars.

Positioning of cover plates 182 in spaced relationship with the vertical portions of side channels 32, 34 and bearing plates 188 and 190 from cover plates 182 as shown in FIG. 19, provides access for rapid removal and replacement of drive or idler sprockets or their shafts, and also facilitates cleaning of the parts by providing fewer crevices in which enrobing material and the like can collect. As will be appreciated, it is essential that the apparatus be easily cleaned and maintained in a sanitary condition, and such placement of the side plates relative to the side channels facilitates such operations.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. Apparatus for enrobing confections with a coating of enrobing material, said apparatus comprising:
   a. conveyor means for conveying a plurality of confections along a conveying path and for permitting liquid material to pass therethrough;
   b. first enrobing station means positioned along the conveyor means for providing first and second downwardly flowing curtains of liquid enrobing material, each of the first and second enrobing material curtains extending transversely relative to the conveying path and spaced from each other along the conveying path to provide successive first and second coatings of enrobing material on upwardly facing and side surfaces of the confections;
   c. first downward air curtain forming means positioned above and transversely of the conveying means and between the first and second enrobing material curtains for directing a curtain of pressurized air against the confections for leveling the first coating of enrobing material;
   d. second downward air curtain means positioned above and transversely of the conveyor means and spaced downstream along the conveying path from the second downwardly flowing curtain of enrobing material for directing a curtain of pressurized air against the confections for leveling the second coating of enrobing material; and
   e. second enrobing station means positioned below the conveyor means and spaced downstream along the conveying path from the first enrobing station means, the second enrobing station means including liquid containing means positioned below the conveyor means to provide a coating of enrobing material on downwardly facing surfaces of the confections.

2. Apparatus in accordance with claim 1, wherein the first enrobing station means includes a V-shaped diverter plate extending transversely of the conveying path, the plate including an upwardly facing apex to define an inverted, V-shaped flow divider, and enrobing material distributor means positioned above the diverter plate for distributing enrobing material along the diverter plate to impinge against the apex of the diverter plate for dividing liquid enrobing material into two spaced, substantially continuous curtains of downwardly flowing enrobing material.

3. Apparatus in accordance with claim 2 wherein the diverter plate is of uniform cross section to provide parallel enrobing material curtains.

4. Apparatus in accordance with claim 1, wherein the first downward air curtain forming means is a tubular air distributor extending transversely of the conveying path and having a downwardly facing, longitudinally extending air slot.

5. Apparatus in accordance with claim 4 wherein the air distributor is positioned within an imaginary triangle defined by the surfaces of the inverted V-shaped flow divider.

6. Apparatus in accordance with claim 1, including conveyor lifting means positioned below the first enrobing station means and extending transversely relative to the conveying path to elevate the conveyor means and define an upwardly extending conveyor support surface upstream of the first enrobing station means, and a downwardly inclined section downstream of the first enrobing station means so that confections are tilted as they pass through the first enrobing station means to expose the forward and rear faces of the confections to the first and second downwardly flowing enrobing material curtains.

7. Apparatus in accordance with claim 6, wherein the conveyor lifting means is parallel to and is positioned vertically below the first downward air curtain means.

8. Apparatus in accordance with claim 6, wherein the conveyor lifting means includes an eccentric bar pivotable about a fixed axis that extends transversely relative to the conveying path to selectively permit elevating and lowering of the conveyor means relative to the first downward air curtain means.

9. Apparatus in accordance with claim 1, wherein the conveying means includes at least one conveyor belt supported for movement about a pair of longitudinally spaced, pivotable conveyor supports that extend transversely relative to the conveying path, one of the conveyor supports including an eccentrically positioned conveyor belt support bar to define a support surface pivotally carried on a frame, so that pivotal movement of the eccentric support bar results in vertical shifting of the conveyor belt, relative to the support bar pivot axis.

10. Apparatus in accordance with claim 9, wherein the eccentrically positioned support bar includes a plurality of laterally spaced notches to receive and guide longitudinally extending elements of the conveyor belt.

11. Apparatus in accordance with claim 1, wherein the second enrobing station means includes pan means positioned below the conveyor means for containing liquid enrobing material for coating the downwardly facing surfaces of said confections, said pan means being movably supported for selective positioning along the conveying path to vary the drain time of said enrobing material from said confections.

12. Apparatus in accordance with claim 11, wherein the second enrobing station means includes a transversely extending enrobing fluid distributor mounted within said pan means having a slot for directing enrobing fluid into said pan means.

13. Apparatus in accordance with claim 12, wherein the slot diverges in width in a transverse direction relative to the conveying path to enable particulate matter having a range of particle sizes and carried by the enrobing fluid to pass through the slot and minimize slot blockage.

14. Apparatus in accordance with claim 13, wherein the divergence of the slot is in an enrobing material flow direction.

15. Apparatus in accordance with claim 1, wherein the second downward air curtain means includes an air distribution chamber that tapers downwardly and outwardly in a transverse plane relative to the conveying path to terminate in a transversely extending air distribution slot that extends across the conveyor means.

16. Apparatus in accordance with claim 15, wherein the air distribution chamber tapers downwardly and inwardly in a longitudinal plane parallel to the conveying path to terminate in the transversely extending air slot.

17. Apparatus in accordance with claim 15, wherein the air distribution chamber includes interiorly positioned guide means for directing air in a downward and outward direction transversely of the conveying path to provide a substantially uniform air flow rate and velocity transversely of the conveying path.

18. Apparatus in accordance with claim 15, wherein the air distribution chamber includes removable panel means extending transversely of the conveying path for facilitating access to the interior of the air distribution chamber for cleaning purposes.

19. Apparatus in accordance with claim 1, including a support frame having a plurality of upwardly extending support members and a pair of transversely spaced longitudinal channel members for supporting the conveyor means, the channel members including opposed access openings for permitting conveyor means drive and support shafts to extend outwardly therethrough, and removable side plate means for covering the channel member access openings, the side plate means adapted to rotatably support conveyor means drive and support shafts.

20. Apparatus in accordance with claim 19, wherein the removable side plate means are spaced outwardly from the channel members by a plurality of spacers to facilitate cleaning.

21. Apparatus in accordance with claim 1 including drip pan means positioned below the conveyor means for receiving and collecting excess enrobing material that passes through the conveyor means, the drip pan means including bottom walls which incline downwardly along the conveyor path and also incline laterally across the conveyor path to a low point, and laterally extending outlet conduit means adjacent the low point of the drip pan means for permitting lateral outward flow of collected enrobing material.

22. Apparatus in accordance with claim 21 wherein the bottom walls of the drip pan means include heating channel means for permitting circulation of heated fluid through the heating channel means for maintaining the enrobing material at a temperature to permit it to flow and to be conveyed through conduits.

23. Apparatus for enrobing confections with a coating of enrobing material, said apparatus comprising:
 a. conveyor means for conveying a plurality of confections along a conveying path and for permitting liquid material to pass therethrough;
 b. first enrobing station means positioned along said conveyor means for coating the upper surfaces of said confections;
 c. second enrobing station means located downstream along the conveying path from the first enrobing station means, the second enrobing station means including liquid containing pan means positioned below the conveyor means to provide a coating of enrobing material on the bottom surfaces of the confections, and means for adjustably supporting said pan means for selective positioning said pan means along the conveyor path to vary the drain time of said enrobing material from said confections.

24. Apparatus in accordance with claim 23, wherein the second enrobing station means includes a transversely extending enrobing fluid distributor mounted within said pan means having a slot for directing enrobing fluid into said pan means.

25. Apparatus in accordance with claim 24, wherein the slot diverges in width in a transverse direction relative to the conveying path to enable particulate matter having a range of particle sizes and carried by the enrobing fluid to pass through the slot and minimize slot blockage.

26. Apparatus in accordance with claim 25, wherein the divergence of the slot is in an enrobing material flow direction.

27. Apparatus in accordance with claim 23 including drip pan means positioned below the conveyor means for receiving and collecting excess enrobing material that passes through the conveyor means at said first and second enrobing stations, the drip pan means including bottom walls which incline downwardly along the conveyor path and also incline downwardly laterally across the conveyor path to a low point, and laterally extending outlet conduit means adjacent the low point of the drip pan means for permitting lateral outward flow of collected enrobing material.

28. Apparatus in accordance with claim 27, wherein the bottom walls of the drip pan means include heating channel means for permitting circulation of heated fluid through the heating channel means for maintaining the enrobing material at a temperature to permit it to flow and to be conveyed through conduits.

29. Apparatus for enrobing confections with a coating of enrobing material, said apparatus comprising:
   a. conveyor means for conveying a plurality of confections along a conveying path and for permitting liquid material to pass therethrough;
   b. first enrobing station means positioned along said conveyor means for coating the upper surfaces of said confections;
   c. second enrobing station means located downstream along the conveying path from the first enrobing station means, the second enrobing station means including liquid containing pan means positioned below the conveyor means to provide a coating of enrobing material on the bottom surfaces of the confections;
   d. drip pan means positioned below the conveyor means for receiving and collecting excess enrobing material that passes through the conveyor means at said first and second enrobing stations, the drip pan means including bottom walls which incline downwardly along the conveyor path and also incline downwardly laterally across the conveyor path to a low point, and laterally extending outlet conduit means adjacent the low point of the drip pan means for permitting lateral outward flow of collected enrobing material.

30. Apparatus in accordance with claim 29, wherein the bottom walls of the drip pan means include heating channel means for permitting circulation of heated fluid through the heating channel means for maintaining the enrobing material at a temperature to permit it to flow and to be conveyed through conduits.

31. Apparatus for enrobing confections with a coating of enrobing material, said apparatus comprising:
   a. conveyor means for conveying a plurality of confections along a conveying path and for permitting liquid material to pass therethrough;
   b. enrobing means positioned along the conveyor means for depositing liquid enrobing material on the confections;
   c. support frame means having a plurality of upwardly extending support members and a pair of transversely spaced longitudinal members for supporting the conveyor means, the longitudinal members including opposed access openings for permitting conveyor means drive and support shafts to extend outwardly therethrough, and removable side plate means for covering the longitudinal member access openings, the side plate means adapted to rotatably support conveyor means drive and support shafts, the removable side plate means being spaced outwardly from the longitudinal members by a plurality of spacers to facilitate cleaning.

32. A method for enrobing confections with an enrobing material, said method comprising:
   a. providing a pair of first and second transversely extending, longitudinally spaced curtains of liquid enrobing material for contacting confections at longitudinally spaced positions in a conveying direction to coat top and side surfaces of the confections with enrobing material;
   b. directing a first curtain of air against the top surfaces of the confections between the first and second enrobing material curtains to provide a smooth first layer of enrobing material on the confections and to remove excess enrobing material;
   c. directing a second curtain of air against upper surfaces of the confections downstream of the second enrobing material curtain to provide a smooth second layer of enrobing material on the confections; and
   d. contacting bottom surfaces of the confections with enrobing material to substantially completely enrobe the confection with enrobing material.

* * * * *